No. 731,502. PATENTED JUNE 23, 1903.
M. F. RONDET.
GEARING.
APPLICATION FILED DEC. 2, 1902.
NO MODEL.

Witnesses  Inventor
Maurice F. Rondet
By Wm E Boulter
Attorney

No. 731,502.

Patented June 23, 1903.

UNITED STATES PATENT OFFICE.

MAURICE FRANÇOIS RONDET, OF PARIS, FRANCE.

GEARING.

SPECIFICATION forming part of Letters Patent No. 731,502, dated June 23, 1903.

Application filed December 2, 1902. Serial No. 133,645. (No model.)

*To all whom it may concern:*

Be it known that I, MAURICE FRANÇOIS RONDET, a citizen of the Republic of France, residing at Paris, in the Republic of France, have invented certain new and useful Improvements in Gearing, of which the following is a specification.

The present invention relates to an improved change-speed gear for general use, but particularly destined as a change-speed gear for motor-vehicles.

Figure 1:
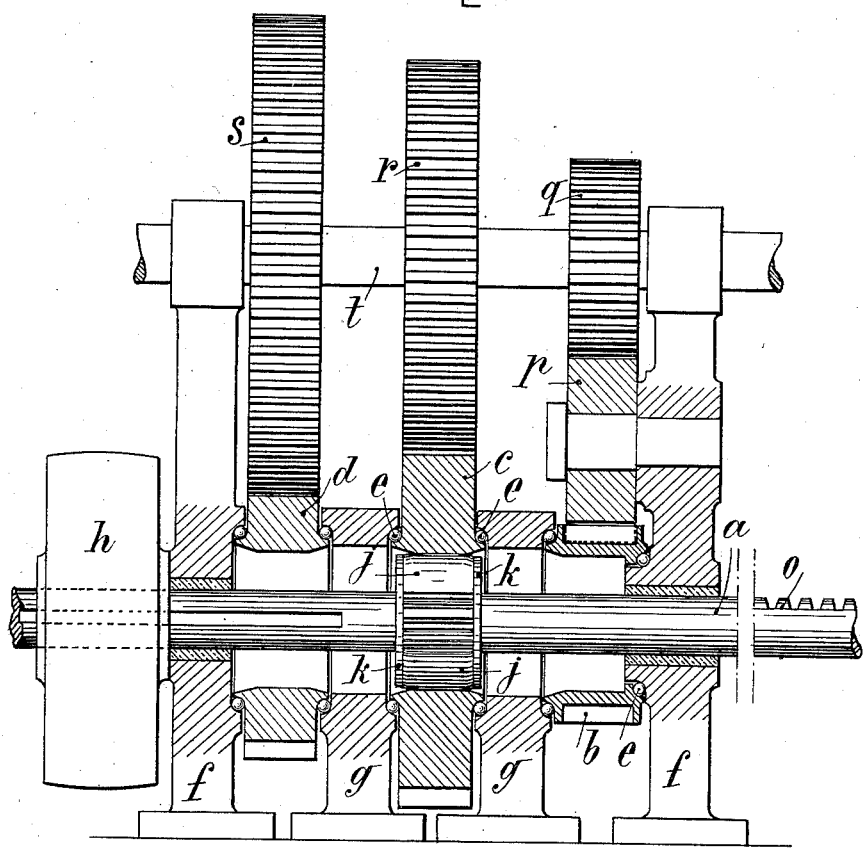
Figures 2, 3:
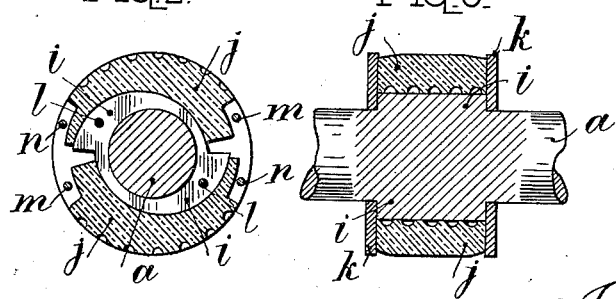

In the accompanying drawings, Figure 1 shows a vertical axial section of a change-speed gear according to this invention. Figs. 2 and 3 represent, on a larger scale, a transverse and longitudinal section, respectively, of the principal member of the improved mechanism.

According to this invention hollow gear-wheels of different diameters $b$ $c$ $d$ are journaled upon ball-bearings $e$ between vertical standards $f$ and $g$. The driving-shaft $a$, carrying a pulley $h$ or any other convenient means for receiving and transmitting motion, is mounted in the outside supports $f$. The inner standards $g$ are hollow in their centers, so as to form around the shaft $a$ annular spaces. The pinions $b$, $c$, and $d$ are also hollow, but their internal diameters are less than that of the openings in the standard $f$. The outer parts of the inner surfaces of the pinions $b$ $c$ $d$ are widened or beveled for a purpose to be hereinafter described.

The device which effects the change of speed consists of an expansible wedge mounted on the driving-shaft $a$ and adapted to move with the shaft longitudinally, so as to be brought in engagement with one or other of the gear-wheels $b$ $c$ $d$. This expansible wedge is constituted by a double cam or cams $i$, upon which are mounted semicircular or curved wedge-plates $j$, arranged concentrically about the shaft $a$. These wedge-plates $j$ can be provided with grooved internal surfaces, so as to diminish their frictional adherence to the cams $i$. Their external surfaces, which are adapted to come in contact with the hubs of the gear-pinions, can be provided with grooves parallel to the axis of rotation, so as to insure a firm engagement with the pinions. Disks $k$, arranged on each side of the cams $i$ and connected through rods $l$, prevent lateral displacement of the wedge-plates $j$ during their motion. The extent of motion, and consequently the extent of expansion of these wedge-plates $j$, is limited by rods or stops $m$ and $n$.

The longitudinal motion or displacement of the device can be effected in any suitable manner—as, for instance, by means of pinions—of which one engages with a rack-bar $o$ integral with or connected with the transmission-shaft $a$.

It is evident that the longitudinal displacement of the device could be effected by means of a sleeve integral with the cams and sliding upon the shaft, and thus moving the wedge device.

In the construction shown by way of example in the drawings the pinions $b$ $c$ $d$ mesh, respectively, with other pinions $p$ $r$ $s$ for the transmission of different speeds to the motor-vehicle or part driven. One of these pinions, $p$, may act as an intermediate gear meshing with a pinion $q$, keyed onto the same shaft $t$ as the other driven pinions $r$ and $s$, and thus serve for the reversal of motion.

The operation is as follows: Upon rotation of the driving-shaft $a$ to the right, as viewed in Fig. 2, the cams $i$ tend to press outwardly the wedge-plates $j$ until the lateral faces of the latter abut against the stops $m$ $m$ and $n$ $n$, which limit the extent of expansion of the wedges. This diameter is smaller than the internal diameter of the openings in the standards $g$ $g$, but larger than the inner diameter of the openings in the pinions $b$ $c$ $d$. Consequently when the shaft $a$ is displaced longitudinally the wedges $j$ pass freely through the openings in the standards $g$, but wedge against the internal circumference of the hubs of the pinions $b$ $c$ $d$ as soon as they are brought in contact with either of these hubs, and they will adhere or bind against said hub the more the greater the speed of rotation of the shaft is increased. Thereby a progressive engagement of the transmission members is insured upon making a change of speed and at the same time avoids shocks, and breakage of the teeth of the gear-pinions is prevented or minimized. The entry of the wedges into the openings of the pinions *b c d* is facilitated by the beveled or widened surfaces at the sides of these openings.

What I claim as my invention, and desire to secure by Letters Patent, is—

1. A change-speed gear comprising hollow transmission-pinions, a transmission-shaft, a cam device mounted on said shaft, and an expansible wedge consisting of wedge-plates loosely mounted upon the cam device and adapted to be brought into contact with the inner surfaces of one or other of the hollow transmission-pinions so as to effect the engagement thereof with the transmission-shaft, and means for limiting the motion of the wedge-plates.

2. A change-speed gear comprising a series of hollow transmission-pinions, the internal bores of which are beveled outwardly, a driving-shaft, a cam device fast thereon, curved wedge-plates loosely mounted upon said cam device, and disks to prevent lateral displacement of the wedge-plates, substantially as described.

In testimony whereof I have signed my name to this specification in the presence of two subscribing witnesses.

MAURICE FRANÇOIS RONDET.

Witnesses:
LOUIS SULLIGER,
EDWARD P. MACLEAN.